US008775682B1

(12) United States Patent
Mathias et al.

(10) Patent No.: US 8,775,682 B1
(45) Date of Patent: Jul. 8, 2014

(54) DATA SYNCHRONIZATION WITH EVENTUAL CONSISTENCY

(75) Inventors: Razvan Mathias, Redmond, WA (US); Jeffrey L. Korn, New York, NY (US); Alexander Sherman, New York, NY (US); Albert Bachand, Brooklyn, NY (US); Nicholas Bennett Carter, Seattle, WA (US); Xiaoyong Liu, Kirkland, WA (US)

(73) Assignee: Google Inc., Mountain View, CA (US)

( * ) Notice: Subject to any disclaimer, the term of this patent is extended or adjusted under 35 U.S.C. 154(b) by 169 days.

(21) Appl. No.: 13/467,005

(22) Filed: May 8, 2012

(51) Int. Cl.
*G06F 15/16* (2006.01)

(52) U.S. Cl.
USPC .......................................................... 709/248

(58) Field of Classification Search
USPC .............................................. 709/248; 707/625
See application file for complete search history.

(56) References Cited

U.S. PATENT DOCUMENTS

| 5,581,753 | A | | 12/1996 | Terry et al. |
| 6,151,606 | A | * | 11/2000 | Mendez .................. 707/610 |
| 6,477,545 | B1 | * | 11/2002 | LaRue ..................... 707/625 |
| 6,694,379 | B1 | * | 2/2004 | Hanko et al. ............ 719/329 |
| 6,799,190 | B1 | | 9/2004 | Boothby |
| 6,810,405 | B1 | * | 10/2004 | LaRue et al. ............. 707/613 |
| 6,874,037 | B1 | * | 3/2005 | Abram et al. ............ 709/248 |
| 6,941,326 | B2 | * | 9/2005 | Kadyk et al. ................. 1/1 |
| 7,006,242 | B2 | * | 2/2006 | Smith et al. ............. 358/1.15 |
| 7,143,117 | B2 | * | 11/2006 | Wolfgang et al. ............. 1/1 |
| 7,305,420 | B2 | * | 12/2007 | Mathias ....................... 1/1 |
| 8,260,742 | B2 | * | 9/2012 | Cognigni et al. ......... 707/620 |
| 8,275,741 | B2 | * | 9/2012 | Tysowski et al. ......... 707/609 |
| 2004/0088335 | A1 | * | 5/2004 | Xu et al. .................. 707/204 |
| 2007/0150482 | A1 | * | 6/2007 | Taylor et al. .............. 707/10 |

OTHER PUBLICATIONS

"Eventual consistency", Wikipedia—The Free Encyclopedia, Feb. 5, 2012, retrieved from <http://en.wikipedia.org/wiki/Eventual_consistency>.

* cited by examiner

*Primary Examiner* — Lance L Barry
(74) *Attorney, Agent, or Firm* — McDermott Will & Emery LLP

(57) ABSTRACT

Computer-implemented methods for synchronizing data between a server and a client are provided. In one aspect, a method includes receiving a request from a client to synchronize data. The request includes a synchronization token that includes client recent synchronization signatures, each client recent synchronization signature representing a state of data synchronization on the client for a certain time period. The method also includes comparing each client recent synchronization signature with a corresponding server recent synchronization signature representing data on a server for the same time period. When the comparison indicates that the data on the client for the time period represented by the client recent synchronization signature is not synchronized with corresponding data on the server for the time period, then the method includes sending the data on the server for the time period to the client. Systems and machine-readable media are also provided.

25 Claims, 4 Drawing Sheets

DATA SYNCHRONIZATION WITH EVENTUAL CONSISTENCY

BACKGROUND

1. Field

The present disclosure generally relates to the transmission of data over a network, and more particularly to the use of a computing device to communicate over a network.

2. Description of the Related Art

A user with a login for an online data service, such as a web browser or email service, commonly uses the login on many different client devices in order to access data associated with the login. The client devices, such as desktop computers and smartphones, therefore usually synchronize data between one another via one or many connected servers in order to provide the user with consistent data regardless of which client the user is using. The servers, however, do not always synchronize data updates between one another immediately, but instead do so eventually ("eventual consistency"). Thus, if the user adds a bookmark to a web browser on a desktop computer that synchronizes the added bookmark to one server, and the user soon thereafter uses a web browser on a smartphone that attempts to synchronize bookmarks from another server, the web browser on the smartphone may not receive the bookmark added by the user on the desktop computer until a much later time.

SUMMARY

According to one embodiment of the present disclosure, a computer-implemented method for synchronizing data between a server and a client is provided. The method includes receiving a request from a client to synchronize data. The request includes a synchronization token. The synchronization token includes client recent synchronization signatures, each client recent synchronization signature representing a state of data synchronization on the client for a certain time period. The method also includes comparing each client recent synchronization signature with a corresponding server recent synchronization signature representing data on a server for the same time period. When a comparison of a client recent synchronization signature with a corresponding server recent synchronization signature indicates that the data on the client for the time period represented by the client recent synchronization signature is not synchronized with corresponding data on the server for the time period, then the method includes sending the data on the server for the time period to the client.

According to another embodiment of the present disclosure, a system for synchronizing data between a server and a client is provided. The system includes a memory for storing instructions, and a processor. The processor is configured to execute the instructions to receive a request from a client to synchronize data. The request includes a synchronization token. The synchronization token includes client recent synchronization signatures, each client recent synchronization signature representing a state of data synchronization on the client for a certain time period. The processor is also configured to execute the instructions to compare each client recent synchronization signature with a corresponding server recent synchronization signature representing data on a server for the same time period, and, when a comparison of a client recent synchronization signature with a corresponding server recent synchronization signature indicates that the data on the client for the time period represented by the client recent synchronization signature is not synchronized with corresponding data on the server for the time period, send the data on the server for the time period to the client, and send an updated synchronization token to the client when the data is sent to the client. The updated synchronization token includes updated client recent synchronization signatures.

According to a further embodiment of the present disclosure, a machine-readable storage medium includes machine-readable instructions for causing a processor to execute a method for synchronizing data between a server and a client is provided. The method includes receiving a request from a client to synchronize data. The request includes a synchronization token. The synchronization token includes client recent synchronization signatures, each client recent synchronization signature representing a state of data synchronization on the client for a certain time period. The method also includes comparing a hash value determined from each client recent synchronization signature with a hash value determined from each corresponding server recent synchronization signature. When a hash value determined from a client recent synchronization signature differs from a hash value determined from a corresponding server recent synchronization signature, the method includes sending the data on the server for the time period represented by the corresponding server recent synchronization signature to the client for overwriting the data on the client for the time period represented by the client recent synchronization signature, and sending an updated synchronization token to the client when the data is sent to the client. The updated synchronization token includes updated client recent synchronization signatures.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
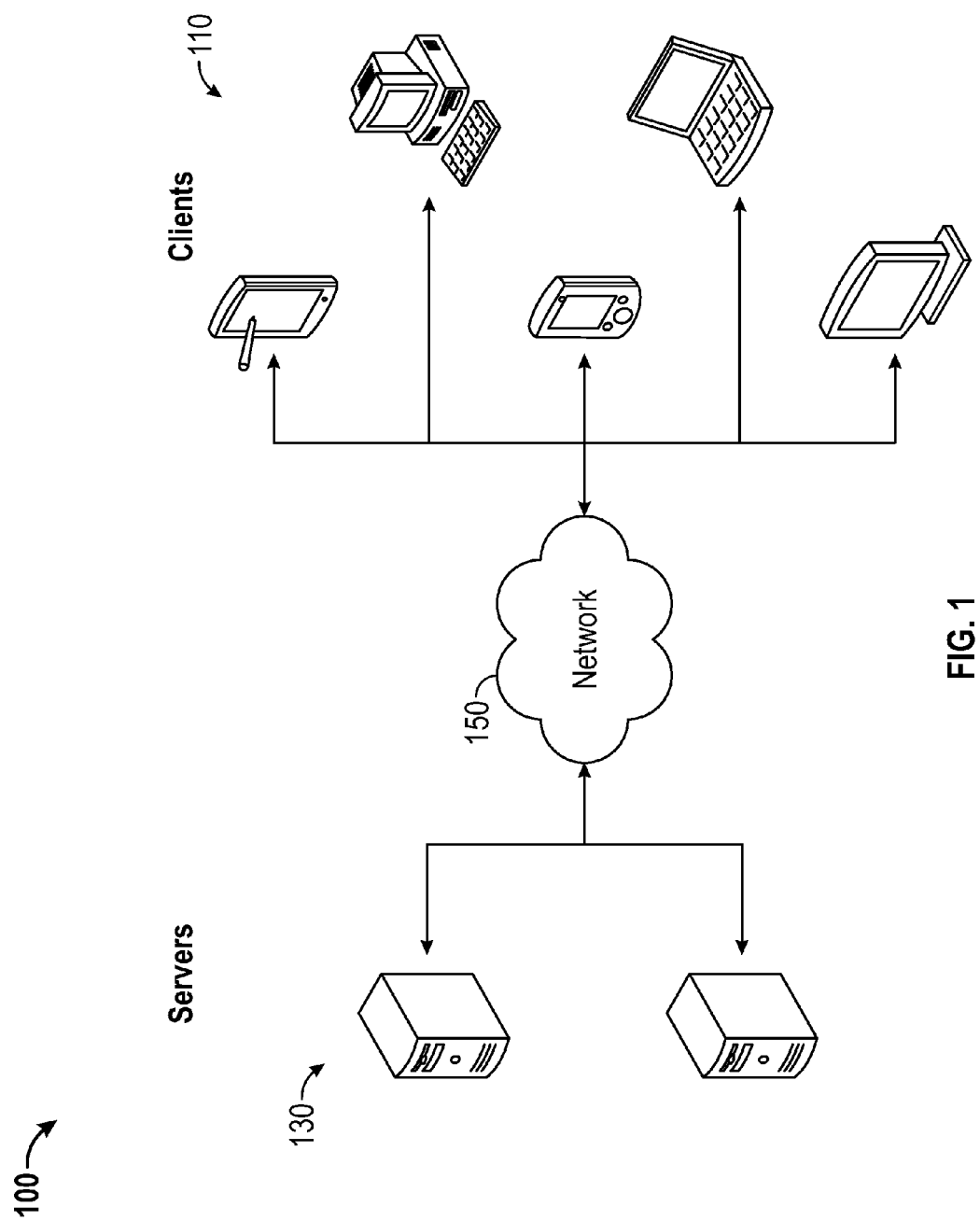
FIG. 1 illustrates an example architecture for synchronizing data between a server and a client.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides a synchronization token for server analysis that summarizes the state of data that a client has synchronized from a server in order to reduce the size and thereby increase the speed and efficiency of data synchronizations with the server. The client receives an updated synchronization token each time the client synchronizes data with a server, and the client provides the updated token to each server with which the client later synchronizes data. The server then analyzes the updated token in order limit the data the server provides to the client to updated data the client needs.

Specifically, a server receives a request from a client to synchronize data (e.g., web browser data, such as bookmarks, browsing history, themes, passwords, etc.) between the server and the client. The synchronization request from the client includes a synchronization token that summarizes the state of synchronizable data on the client. The synchronization token is divided into two parts, a first part that summarizes the state of older synchronizable data changes on the client (e.g., data changes that are more than an hour old, and likely to be available on all servers with which the client can synchronize), and a second part that summarizes the state of newer synchronizable data changes on the client (e.g., data changes that are less than an hour old, and not likely to be available on all servers with which the client can synchronize). The first part (e.g., representing older data changes) of the synchronization token is represented by a single hash. The second part (e.g., representing newer data changes) of the synchronization token is represented by multiple hashes, with each of the multiple hashes representing data changes for (or otherwise made in) a certain time period. For example, if the second part of the synchronization token includes 10 hashes representing synchronizable data changes within the last hour, then each hash would represent data changes within about a 6 minute time span. The server determines the hash value of each hash, and compares the hash value with the server's own hash values of the server's corresponding hashes for synchronizable data for the same time periods. If any hash values differ, then the server determines that the corresponding synchronizable data on the client for that time period is out of date, and the server then provides the corresponding synchronizable data to the client, along with an updated synchronization token. The updated synchronization token is provided by the client to a server in any subsequent attempts to synchronize data with a server. Thus, the client can synchronize data with multiple eventually consistent servers using updated tokens, and avoid receiving duplicate or old data from one of the multiple eventually consistent servers.

Although many examples provided herein describe a user's information (e.g., synchronizable data) being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

FIG. 1 illustrates an example architecture 100 for synchronizing data between a server and a client. The architecture 100 includes servers 130 and clients 110 connected over a network 150.

Each of the clients 110 is configured to run an application, such as a web browser electronic messaging client, or music player, as disclosed herein. The application is configured to run on clients 110 that are mobile or non-mobile. The clients 110 can be, for example, desktop computers, laptop computers, mobile devices (e.g., a smartphone, tablet computer, or PDA), set top boxes (e.g., for a television), video game consoles, projectors, or any other devices having appropriate processor, memory, and communications capabilities.

Data for the application can be synchronized by the application on any of the clients 110 over the network 150 with one or many of the servers 130. For purposes of load balancing, multiple servers 130 can host the synchronizable data for the application. The servers 130 can be any device having an appropriate processor, memory, and communications capability for hosting the synchronizable data. In certain aspects, the servers are eventually consistent servers in that the servers may not always synchronize data updates between one another immediately, but instead do so eventually. The synchronizable data can include, for example: user profiles for accessing the synchronizable data; Uniform Resource Identifiers (URIs) such as bookmarks and identifications of web pages a user has previously opened; logins, including user names and passwords; web browser history, including currently opened tabs; search history, including previously entered search queries; form information; web browser components (e.g., web browser extensions and web browser applications); web browser themes; messaging data; and media play list data.

As discussed herein, a web browser application (or "web app") is a software program that is designed to be installed by a web browser and used within the web browser. Web apps can be, for example, hosted web apps or packaged web apps. A hosted web app includes data for a display of a normal website supplemented with extra metadata. The extra metadata provides a description of the application, including, for example, a name, description, version, relevant web addresses (e.g., URI addresses that the hosted web app uses), launch instructions, appearance data, icon information, unique identifier(s), compatible web browser information, and update information. Unlike hosted web apps, packaged web apps are downloadable and can therefore operate offline. Packaged web apps are also integratable with a web browser because hosted web apps are configured to access web browser extensions.

As discussed herein, a web browser extension (hereinafter "extension") is a software program that modifies and/or adds functionality to a web browser. Both extensions and packaged web apps can be written using, for example, web technologies such as HyperText Markup Language (HTML), JavaScript, and Cascading Style Sheets (CSS). An extension can be used to build packaged web apps. Both extensions and packaged web apps can bundle all associated data into a single data file that the web browser downloads and installs. Thus, unlike hosted web apps, extensions and packaged web apps do not depend on an active network connection.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed application is configured to synchronize data on a client 110 with corresponding synchronizable data on one or many of the eventually consistent servers 130. Synchronization is completed by a synchronization token being provided by a client 110 to one of the eventually consistent servers 130. The synchronization token reflects the status of synchronizable data on the client 110. Specifically, the synchronization token includes one or many hashes, each hash representing synchronizable data for a certain time period (e.g., a first hash representing data synchronized in the last 15 minutes, a second hash representing data synchronized in the 15 minutes before the first hash, etc.). The server 130 compares each hash in the synchronization token with a corresponding hash for synchronizable data for the same time periods on the server 130. If the hashes match, it indicates to the server 130 that the client 110 has the same synchronizable data for that time period as the server. On the other hand, if the hashes do not match, it indicates to the server 130 that the client 110 does not have the same synchronizable data for that time period as the server 130, and the server 130 sends the synchronizable data for that time period to the client along with an updated synchronization token. The client then decides whether to override, store, or further analyze the synchronizable data received from the server. The client can use the updated synchronization token for later synchronization with other eventually consistent servers. As a result of this process, an eventually consistent server limits transmitting data to a client to data the client does not appear to have.

Figure 2:
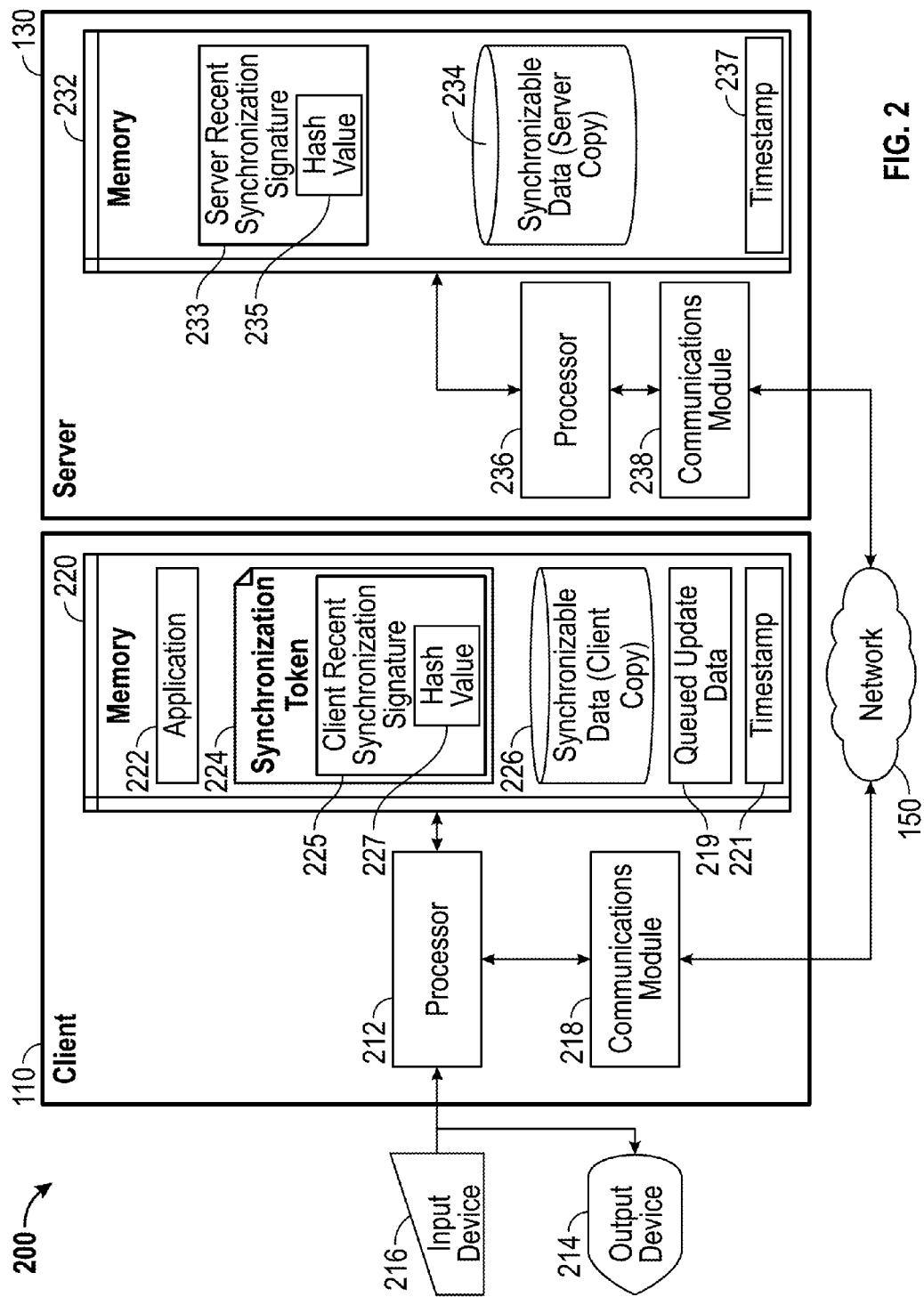
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220. The memory 220 includes an application 222, a local, client copy of synchronizable data 226 for the application 222, and a synchronization token 224. The application 222 is displayed on the client 110 using the output device 214 (e.g., a display) of the client 110. The client 110 also includes an input device 216, such as a keyboard, touchscreen, or mouse, to receive user input for the application 222. The synchronizable data 226 for the application 222 can be synchronized across various other clients associated with the client 110, via a server copy of synchronizable data 234 stored in memory 232 on the server 130, by respective applications that are associated among the clients 110, such as by using a common pre-existing user profile (e.g., a pre-existing email address and password combination). The pre-existing profile can be associated with the data synchronization process disclosed herein by, for example, providing the pre-existing profile to the application 222 for the first time. The synchronizable data 226 in the memory 220 of the client 110 can be first generated on the client 110 (e.g., when the pre-existing profile is provided to the web browser 222 for the first time), or downloaded to the client 110 from a server copy of synchronizable data 234 stored in a memory 232 of a server 130. Specifically, the synchronizable data 234 can be provided to the client 110 over the network 150 by the processor 236 of the server 130 via respective communications modules 218 and 238 of the client 110 and server 130. Similarly, the synchronization token 224 in the memory 220 of the client 110 can be downloaded to the client 110 from a server 130 when the client 110 previously synchronizes with the server 130.

The processor 236 of the server 110 is configured to execute instructions, such as instructions physically coded into the processor 236, instructions received from software in memory 232, or a combination of both. For example, the processor 212 of the client 110 executes instructions to receive a request from a client 110 to synchronize data, the request including a synchronization token 224 indicating a state of data synchronization on the client 110. The synchronization token 224 includes client recent synchronization signatures 225. Each client recent synchronization signature 225 represents a state of synchronizable data 226 on the client 110 for a certain time period (e.g., synchronizable data 226 that was synchronized during that certain time period). The number of client recent synchronization signatures 225 can be determined based on a frequency of data synchronization. For example, when the frequency of data synchronization is expected to be infrequent, the number of client recent synchronization signatures 225 can be decreased, thereby decreasing the size (and resulting amount of data to be transferred) of the synchronizable data for the time period represented by each hash. Similarly, when the frequency of data synchronization is expected to be frequent, the number of client recent synchronization signatures 225 can be increased, thereby increasing the size (and resulting amount of data to be transferred) of the synchronizable data for the time period represented by each hash. As a result, the size of the synchronization token 224 (e.g., based on the number of hashes included in the synchronization token 224) can increase as the frequency of data synchronization is increased. As one example, the synchronization token 224 can include 45 client recent synchronization signatures 225 representing changes made in synchronizable data 226 during the last one hour.

The processor 236 is also configured to compare each client recent synchronization signature 225 with a corresponding server recent synchronization signature 233 representing synchronizable data 234 on a server 130 (e.g., the same server 130 or another server hosting synchronizable data, as discussed above) for the same time period. When a comparison of a client recent synchronization signature 225 with a corresponding server recent synchronization signature 233 indicates that the synchronizable data 226 on the client 110 for the time period represented by the client recent synchronization signature 225 is not synchronized with corresponding synchronizable data 234 on the server 130 for the same time period, the processor 236 is configured to send the synchronizable data 234 on the server 130 for the time period to the client 110. Sending the synchronizable data 234 on the server 130 for the time period to the client 110 can include sending the synchronizable data 234 on the server 130 for the time period represented by the corresponding server recent synchronization signature 233 to the client 130 for overwriting or for storage when a hash value 227 determined from a client recent synchronization signature 225 differs from a hash value 235 determined from a corresponding server recent synchronization signature 233. In certain aspects, the processor 236 can also send an updated synchronization token to the client 110 when the synchronizable data 234 is sent to the client 110. The updated synchronization token includes updated client recent synchronization signatures 225.

Comparing the client recent synchronization signatures 225 with the server recent synchronization signatures 233 can include comparing a hash value 227 determined from each client recent synchronization signature 225 with a hash value 235 determined from each corresponding server recent synchronization signature 233. If a hash value 227 determined from a client recent synchronization signature 225 differs from a hash value 235 determined from a corresponding server recent synchronization signature 233, then the processor 236 can take various steps. In one example, the processor 236 can provide a timestamp value 237 associated with the synchronizable data 234 on the server 130 for the time period represented by the corresponding server recent synchronization signature 233 to the client 110 for comparison with a timestamp value 221 associated with the data on the client for the time period represented by the client recent synchronization signature 225. The processor 236 then sends the synchronizable data 234 on the server 130 for the time period represented by the corresponding server recent synchronization signature 233 to the client 110 for overwriting the synchronizable data 226 on the client 110 for the time period represented by the client recent synchronization signature 225 when the timestamp value 237 associated with the synchronizable data 234 on the server is different than the timestamp value 221 associated with the synchronizable data 226 on the client 110. A clock on the server 130 (that generates a timestamp) and a clock on the client 110 can be synchronized individually (e.g., with reference to separate clocks accessible by the server 130 and/or the client 110), or the clocks can be synchronized with a single clock (e.g., a global clock).

In another example, the processor 236 can provide a timestamp value 237 associated with the synchronizable data 234 on the server 130 for the time period represented by the corresponding server recent synchronization signature 233 to the client 110 for comparison with a timestamp value associated with queued update data 219 (e.g., synchronizable data received by the client 110 but not yet applied) on the client 110 for the time period represented by the client recent synchronization signature 225. The processor 236 then sends the synchronizable data 234 on the server 130 for the time period represented by the corresponding server recent synchronization signature 233 to the client 110 for overwriting the queued update data 219 on the client 110 for the time period represented by the client recent synchronization signature 225 when the timestamp value 237 associated with the synchronizable data 234 on the server is different than the timestamp value associated with the queued update data 219 on the client 110.

In yet another example, the processor 236 can send the synchronizable data 234 on the server 130 for the time period represented by the corresponding server recent synchronization signature 233 to the client 110 for merging with the synchronizable data 226 on the client 110 for the time period represented by the client recent synchronization signature 225 when a hash value 227 determined from a client recent synchronization signature 225 differs from a hash value 235 determined from a corresponding server recent synchronization signature 233. The merging, on the client 110, of the synchronizable data 234 from the server 130 for the time period represented by the corresponding server recent synchronization signature 233 with the synchronizable data 226 on the client 110 for the time period represented by the client recent synchronization signature 225 can include creating a union of differing properties between the synchronizable data 234 on the server 130 for the time period represented by the corresponding server recent synchronization signature 233 and the synchronizable data 226 on the client 110 for the time period represented by the client recent synchronization signature 225.

In certain aspects, the synchronization token 224 includes a first portion including the client recent synchronization signatures 225, and a second portion including a replicated synchronization signature for the client 110. The client replicated synchronization signature represents a state of data on the client for a time period older than the time periods associated with the client recent synchronization signatures 225. For example, each recent synchronization signature can represent synchronizable data for recent time periods (e.g., a first recent synchronization signature representing synchronizable data for a period of the last 15 minutes, a second recent synchronization signature representing synchronizable data for the 15-minute period before the last 15 minutes, a third recent synchronization signature representing synchronizable data for the 15-minute period before the last 30 minutes, and a fourth recent synchronization signature representing synchronizable data for the 15-minute period before the last 45 minutes, for a total of four recent synchronization signatures representing the last one hour), and the replicated synchronization signature can represent synchronizable data that was synchronized or is otherwise older than one hour. The processor 236 can then compare the client replicated synchronization signature with a corresponding replicated synchronization signature for the server 130 representing synchronizable data 234 on the server 130 for the same time period, and, when a comparison of the client replicated synchronization signature for the client 110 with the server replicated synchronization signature indicates that the synchronizable data 226 on the client 110 for the time period represented by the client replicated synchronization signature is not synchronized with corresponding synchronizable data 234 on the server 130, the processor 236 can then send the synchronizable data 234 on the server 130 for the time period represented by the client replicated synchronization signature to the client 110.

Figure 3:
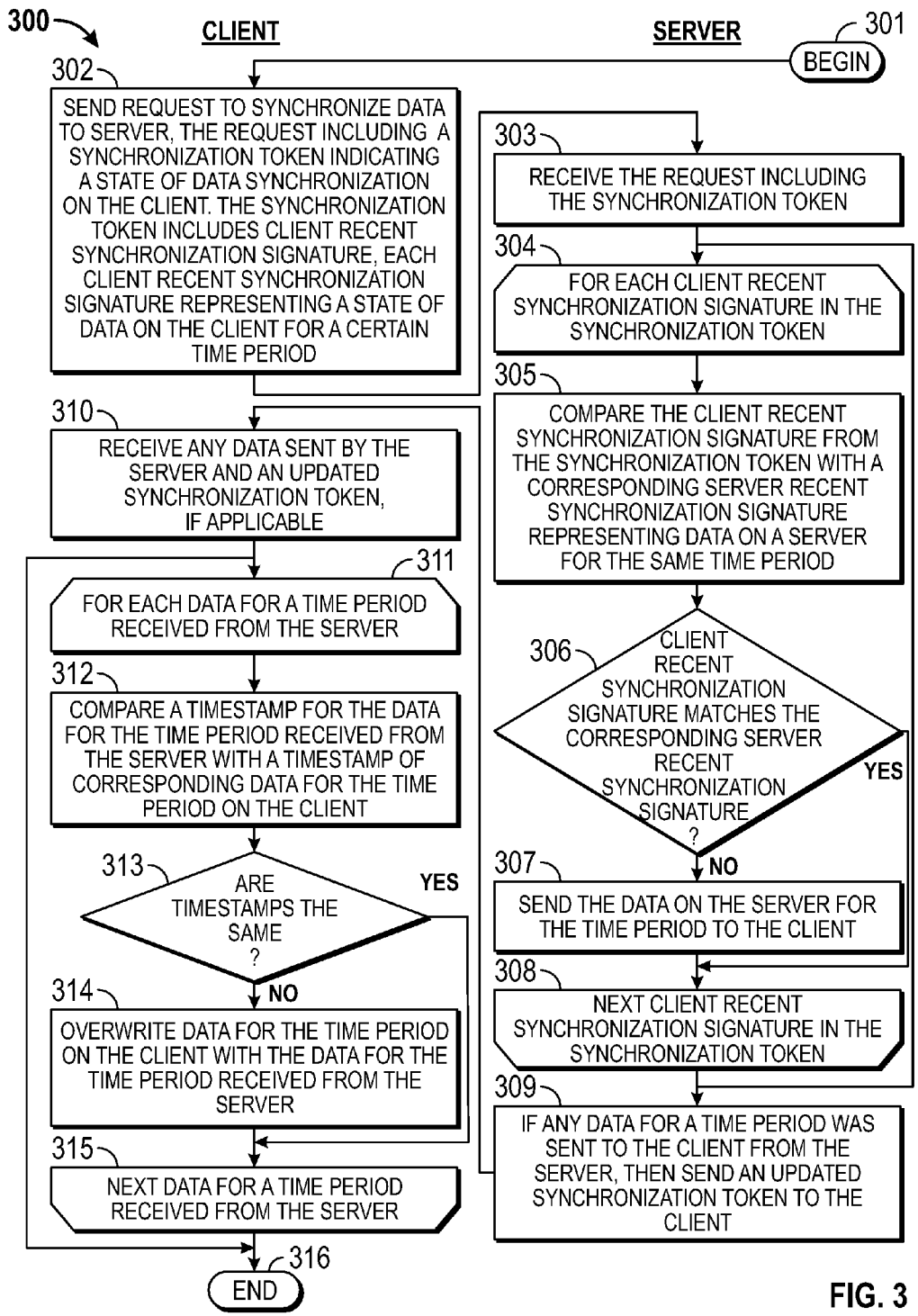
FIG. 3 illustrates an example process for synchronizing data between a server and a client using the example client and server of FIG. 2.

FIG. 3 illustrates an example process 300 for synchronizing data between a server and a client using the example client 110 and server 130 of FIG. 2. While FIG. 3 is described with reference to FIG. 2, it should be noted that the process steps of FIG. 3 may be performed by other systems. The process 300 begins by proceeding from beginning step 301 when an application 222 associated with synchronizable data 226 is loaded on the client 110, to step 302 when a request to synchronize data is sent to the server 130, the request including a synchronization token 224 indicating a state of data synchronization on the client 110. The synchronization token includes client recent synchronization signatures 225, with each client recent synchronization signature 225 representing a state of synchronizable data 226 on the client 110 for a certain time period. In step 303, the server 130 receives the request that includes the synchronization token 224 and begins looping through steps 304 to 308 for each client recent synchronization signature 225 in the synchronization token 224. Specifically, for each client recent synchronization signature 225 in the synchronization token 224 as indicated in beginning loop step 304, the client recent synchronization signature 225 from the synchronization token 224 is compared in step 305 with a corresponding server recent synchronization signature 233 representing data on a server (e.g., the same server 130 or another server hosting synchronizable data) for the same time period.

If in decision step 306 it is determined that the client recent synchronization signature 225 does not match the corresponding server recent synchronization signature 233, then the process 300 proceeds to step 307 in which the synchronizable data 234 on the server 130 for the time period represented by the client recent synchronization signature 225 is sent to the client 110. The process 300 then proceeds to end loop step 308, in which the process 300 returns to step 304 if there is another client recent synchronization signature 225 in the synchronization token, until there are no additional client recent synchronization signatures 225. If in decision step 306 it is determined that the client recent synchronization signature 225 does match the corresponding server recent synchronization signature 233, then the process 300 directly proceeds to end loop step 308.

In step 309, if any synchronizable data 234 for a time period was sent to the client 110 (e.g., during steps 304 to 310), then an updated synchronization token 224 is generated (e.g., with updated hash values based on the synchronizable data 234 sent from the server 130) and sent to the client 110. Returning to the client 110, in step 310 any data sent by the server 130 and an updated synchronization token 224 (if available), is received, and a loop of steps 311 to 315 begins. Specifically, for each synchronizable data 234 for a time period received from the server 130, as indicated in beginning loop step 311, in step 312 a timestamp for the synchronizable data 234 for the time period received from the server 130 is compared with a timestamp of corresponding synchronizable data 226 for the time period stored on the client 110.

If in decision step 313 the timestamps are determined to be different, then in step 314 the synchronizable data 226 for the time period on the client 110 is overwritten with the synchronizable data 234 for the time period received from the server 130. Then, from end loop step 315, the process 300 returns to step 311 for the next synchronizable data 234 for a time period received from the server 130 until no additional synchronizable data 234 for a time period received from the server 130 remains. Otherwise, if in decision step 313 the timestamps are determined to be the same, then the process 300 proceeds directly to end loop step 315. The process 300 ends in step 316.

An example will now be described using the example process 300 of FIG. 3 and an application 222 that is a web browser miming on a client 110 that is a desktop computer. The process 300 begins by proceeding from beginning step 301 when the web browser 222 is loaded by a user on the desktop 110. In step 302, after the web browser 222 authenticates user sign in data (e.g., by the user providing a valid email address and password combination), the web browser 222 sends a request to synchronize web browser to the server 130, the request including a synchronization token 224 indicating a state of the web browser data synchronization on the client 110. The synchronization token includes 30 client recent synchronization signatures 225 representing changes made in the synchronizable web browser data 226 over the last one hour. Each client recent synchronization signature 225 represents a two-minute period of the one hour. The synchronization token also includes 1 client replicated synchronization signature representing changes made in the synchronizable web browser data 226 before the last one hour.

In step 303, the server 130 receives the request that includes the synchronization token 224 and begins looping through steps 304 to 308 for each client hash in the synchronization token 224, including the client recent synchronization signatures 225 and the client replicated synchronization signature. Specifically, for each client hash in the synchronization token 224 as indicated in beginning loop step 304, the client hash from the synchronization token 224 is compared in step 305 with a corresponding server recent synchronization signature 233 representing data on a server (e.g., the same server 130 or another server hosting synchronizable data) for the same time period.

If in decision step 306 it is determined that the client recent synchronization signature 225 does not match the corresponding server recent synchronization signature 233, then the process 300 proceeds to step 307 in which the synchronizable data 234 on the server 130 for the time period represented by the client recent synchronization signature 225 is sent to the user's desktop computer 110. The process 300 then proceeds to end loop step 308, in which the process 300 returns to step 304 for each of the remaining client recent synchronization signatures 225 and for the client replicated synchronization signature, until there are no additional client hashes. A total of 3 client recent synchronization signatures 225 and the single client replicated synchronization signature were determined to not match their corresponding server hashes, and the corresponding web browser synchronization data 234 on the server 130 for the time periods associated with those hashes was sent to the desktop computer 110. In step 309, an updated synchronization token 224 is generated (e.g., with updated hash values based on the web browser synchronizable data 234 sent from the server 130) and sent to the desktop computer 110.

Returning to the user's desktop computer 110, in step 310 the synchronizable web browser data 234 sent by the server 130, and the updated synchronization token 224, are received. Then the loop of steps 311 to 315 begins. Specifically, for each synchronizable web browser data 234 for a time period received from the server 130, as indicated in beginning loop step 311, in step 312 a timestamp 237 for the synchronizable web browser data 234 for the time period received from the server 130 is compared with a timestamp 221 of corresponding synchronizable web browser data 226 for the time period stored on the desktop computer 110.

If in decision step 313 the timestamps are determined to be different, then in step 314 the synchronizable web browser data 226 for the time period on the client 110 is overwritten with the synchronizable data 234 for the time period received from the server 130. Then, from end loop step 315, the process 300 returns to step 311 for the next synchronizable data 234 for a time period received from the server 130 until no additional synchronizable data 234 for a time period received from the server 130 remains. Otherwise, if in decision step 313 the timestamps are determined to be the same, then the process 300 proceeds directly to end loop step 315. After the loop has completed, in which each of the client timestamps were determined to be different, all of the synchronizable web browser data 226 for the 3 client recent synchronization signatures 225 and the single client replicated synchronization signature was overwritten with the synchronizable web browser data 234 from the server. As a result, the web browser 222 on the desktop computer 110 is now up to date with the latest synchronizable web data on either the desktop computer 110 or the server 130.

Figure 4:
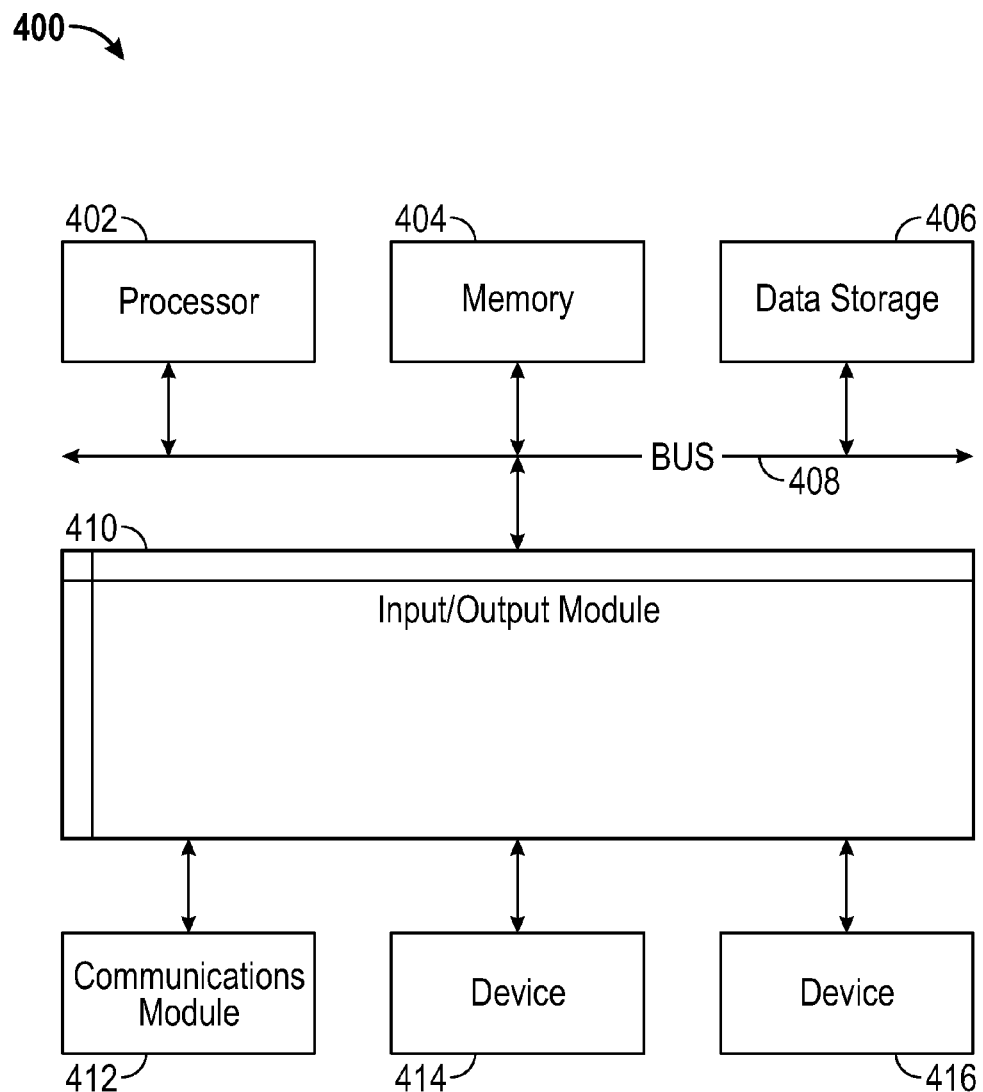
FIG. 4 is a block diagram illustrating an example computer system with which the clients and server of FIG. 2 can be implemented.

FIG. 4 is a block diagram 400 illustrating an example computer system 400 with which the client 110 and server 103 of FIG. 2 can be implemented. In certain aspects, the computer system 400 may be implemented using hardware or a combination of software and hardware, either in a dedicated server, or integrated into another entity, or distributed across multiple entities.

Computer system 400 (e.g., client 110 and servers 130) includes a bus 408 or other communication mechanism for communicating information, and a processor 402 (e.g., processor 212 and 236) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 (e.g., communications module 218 and 238) include networking interface cards, such as Ethernet cards and modems. In certain aspects, the input/output module 410 is configured to connect to a plurality of devices, such as an input device 414 (e.g., input device 216) and/or an output device 416 (e.g., output device 214). Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 402 for execution. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for synchronizing data between a server and a client, the method comprising:
   receiving a request from a client to synchronize data, the request comprising a synchronization token, wherein the synchronization token comprises client recent synchronization signatures, each client recent synchronization signature representing a state of data synchronization on the client for a certain time period;
   comparing each client recent synchronization signature with a corresponding server recent synchronization signature representing data on a server for the same time period;
   when a comparison of a client recent synchronization signature with a corresponding server recent synchronization signature indicates that the data on the client for the time period represented by the client recent synchronization signature is not synchronized with corresponding data on the server for the time period, sending the data on the server for the time period to the client; and
   sending an updated synchronization token to the client when the data is sent to the client, wherein the updated synchronization token comprises updated client recent synchronization signatures.

2. The computer-implemented method of claim 1, wherein comparing the client recent synchronization signatures with the server recent synchronization signatures comprises comparing a hash value determined from each client recent synchronization signature with a hash value determined from each corresponding server recent synchronization signature.

3. The computer-implemented method of claim 2, wherein if a hash value determined from a client recent synchronization signature differs from a hash value determined from a corresponding server recent synchronization signature, the method further comprises:
   providing a timestamp value associated with the data on the server for the time period represented by the corresponding server recent synchronization signature to the client for comparison with a timestamp value associated with the data on the client for the time period represented by the client recent synchronization signature; and
   wherein sending the data on the server for the time period to the client comprises sending the data on the server for the time period represented by the corresponding server recent synchronization signature to the client for overwriting the data on the client for the time period represented by the client recent synchronization signature when the timestamp value associated with the data on the server is different than the timestamp value associated with the data on the client.

4. The computer-implemented method of claim 2, wherein if a hash value determined from a client recent synchronization signature differs from a hash value determined from a corresponding server recent synchronization signature, the method further comprises:
   providing a timestamp value associated with the data on the server for the time period represented by the corresponding server recent synchronization signature to the client for comparison with a timestamp value associated with queued update data on the client for the time period represented by the client recent synchronization signature; and wherein sending the data on the server for the time period to the client comprises sending the data on the server for the time period represented by the corresponding server recent synchronization signature to the client for overwriting the queued update data on the client for the time period represented by the client recent synchronization signature when the timestamp value associated with the data on the server is different than the timestamp value associated with the queued update data on the client.

5. The computer-implemented method of claim 2, wherein sending the data on the server for the time period to the client comprises sending the data on the server for the time period represented by the corresponding server recent synchronization signature to the client for merging with the data on the client for the time period represented by the client recent synchronization signature when a hash value determined from a client recent synchronization signature differs from a hash value determined from a corresponding server recent synchronization signature.

6. The computer-implemented method of claim 5, wherein the merging of the data on the server for the time period represented by the corresponding server recent synchronization signature with the data on the client for the time period represented by the client recent synchronization signature comprises creating a union of differing properties between the data on the server for the time period represented by the corresponding server recent synchronization signature and the data on the client for the time period represented by the client recent synchronization signature.

7. The computer-implemented method of claim 1, wherein sending the data on the server for the time period to the client comprises sending the data on the server for the time period represented by the corresponding server recent synchronization signature to the client for storage when a hash value determined from a client recent synchronization signature differs from a hash value determined from a corresponding server recent synchronization signature.

8. The computer-implemented method of claim 1, wherein the number of client recent synchronization signatures is determined based on a frequency of data synchronization.

9. The computer-implemented method of claim 8, the number of client recent synchronization signatures is decreased when the frequency of data synchronization is decreased.

10. The computer-implemented method of claim 9, wherein a size of the synchronization token increases as the frequency of data synchronization is increased.

11. The computer-implemented method of claim 1, wherein the data to be synchronized comprises at least one of web browser data, audio data, and electronic mail data.

12. The computer-implemented method of claim 1, wherein the synchronization token comprises a first portion comprising the client recent synchronization signatures and a second portion comprising a replicated synchronization signature for the client, the client replicated synchronization signature representing a state of data synchronization on the client for a time period older than the time periods associated with the client recent synchronization signatures, and the method further comprises:

comparing the client replicated synchronization signature with a corresponding replicated synchronization signature for the server representing data on the server for the same time period; and when a comparison of the client replicated synchronization signature for the client with the server replicated synchronization signature indicates that the data on the client for the time period represented by the client replicated synchronization signature is not synchronized with corresponding data on the server, sending the data on the server for the time period represented by the client replicated synchronization signature to the client.

13. A system for synchronizing data between a server and a client, the system comprising:

a memory for storing instructions;

a processor configured to execute the instructions to:

receive a request from a client to synchronize data, the request comprising a synchronization token, wherein the synchronization token comprises client recent synchronization signatures, each client recent synchronization signature representing a state of data synchronization on the client for a certain time period;

compare each client recent synchronization signature with a corresponding server recent synchronization signature representing data on a server for the same time period;

when a comparison of a client recent synchronization signature with a corresponding server recent synchronization signature indicates that the data on the client for the time period represented by the client recent synchronization signature is not synchronized with corresponding data on the server for the time period, send the data on the server for the time period to the client; and send an updated synchronization token to the client when the data is sent to the client, wherein the updated synchronization token comprises updated client recent synchronization signatures.

14. The system of claim 13, wherein the processor being configured to execute the instructions to compare the client recent synchronization signatures with the server recent synchronization signatures comprises the processor being configured to execute the instructions to compare a hash value determined from each client recent synchronization signature with a hash value determined from each corresponding server recent synchronization signature.

15. The system of claim 14, wherein if a hash value determined from a client recent synchronization signature differs from a hash value determined from a corresponding server recent synchronization signature, then the processor is configured to execute the instructions to:

provide a timestamp value associated with the data on the server for the time period represented by the corresponding server recent synchronization signature to the client for comparison with a timestamp value associated with the data on the client for the time period represented by the client recent synchronization signature; and wherein the processor being configured to execute the instructions to send the data on the server for the time period to the client comprises the processor being configured to execute the instructions to send the data on the server for the time period represented by the corresponding server recent synchronization signature to the client for overwriting the data on the client for the time period represented by the client recent synchronization signature when the timestamp value associated with the data on the server is different than the timestamp value associated with the data on the client.

16. The system of claim 14, wherein if a hash value determined from a client recent synchronization signature differs from a hash value determined from a corresponding server recent synchronization signature, the processor is configured to execute the instructions to:

provide a timestamp value associated with the data on the server for the time period represented by the corresponding server recent synchronization signature to the client for comparison with a timestamp value associated with queued update data on the client for the time period represented by the client recent synchronization signature; and wherein the processor being configured to execute the instructions to send the data on the server for the time period to the client comprises the processor being configured to execute the instructions to send the data on the server for the time period represented by the corresponding server recent synchronization signature to the client for overwriting the queued update data on the client for the time period represented by the client recent synchronization signature when the timestamp value associated with the data on the server is different than the timestamp value associated with the queued update data on the client.

17. The system of claim 14, wherein the processor being configured to execute the instructions to send the data on the server for the time period to the client comprises the processor being configured to execute the instructions to send the data on the server for the time period represented by the corresponding server recent synchronization signature to the client for merging with the data on the client for the time period represented by the client recent synchronization signature when a hash value determined from a client recent synchronization signature differs from a hash value determined from a corresponding server recent synchronization signature.

18. The system of claim 17, wherein the merging of the data on the server for the time period represented by the corresponding server recent synchronization signature with the data on the client for the time period represented by the client recent synchronization signature comprises creating a union of differing properties between the data on the server for the time period represented by the corresponding server recent synchronization signature and the data on the client for the time period represented by the client recent synchronization signature.

19. The system of claim 13, wherein the processor being configured to execute the instructions to send the data on the server for the time period to the client comprises the processor being configured to execute the instructions to send the data on the server for the time period represented by the corresponding server recent synchronization signature to the client for storage when a hash value determined from a client recent synchronization signature differs from a hash value determined from a corresponding server recent synchronization signature.

20. The system of claim 13, wherein the number of client recent synchronization signatures is determined based on a frequency of data synchronization.

21. The system of claim 20, the number of client recent synchronization signatures is decreased when the frequency of data synchronization is decreased.

22. The system of claim 21, wherein a size of the synchronization token increases as the frequency of data synchronization is increased.

23. The system of claim 13, wherein the data to be synchronized comprises at least one of web browser data, audio data, and electronic mail data.

24. The system of claim 13, wherein the synchronization token comprises a first portion comprising the client recent synchronization signatures and a second portion comprising a replicated synchronization signature for the client, the client replicated synchronization signature representing a state of data synchronization on the client for a time period older than the time periods associated with the client recent synchronization signatures, and the processor is further configured to execute the instructions to:

compare the client replicated synchronization signature with a corresponding replicated synchronization signature for the server representing data on the server for the same time period; and when a comparison of the client replicated synchronization signature for the client with the server replicated synchronization signature indicates that the data on the client for the time period represented by the client replicated synchronization signature is not synchronized with corresponding data on the server, send the data on the server for the time period represented by the client replicated synchronization signature to the client.

25. A non-transitory machine-readable storage medium comprising machine-readable instructions for causing a processor to execute a method for synchronizing data between a server and a client, the method comprising:

receiving a request from a client to synchronize data, the request comprising a synchronization token, wherein the synchronization token comprises client recent synchronization signatures, each client recent synchronization signature representing a state of data synchronization on the client for a certain time period;

comparing a hash value determined from each client recent synchronization signature with a hash value determined from each corresponding server recent synchronization signature;

when a hash value determined from a client recent synchronization signature differs from a hash value determined from a corresponding server recent synchronization signature, sending the data on the server for the time period represented by the corresponding server recent synchronization signature to the client for overwriting the data on the client for the time period represented by the client recent synchronization signature; and sending an updated synchronization token to the client when the data is sent to the client, wherein the updated synchronization token comprises updated client recent synchronization signatures.

* * * * *